(12) United States Patent
Ruys et al.

(10) Patent No.: US 10,383,291 B2
(45) Date of Patent: Aug. 20, 2019

(54) METHOD AND APPARATUS FOR PLANTING IN ARID ENVIRONMENTS

(71) Applicant: Land Life Company B.V., Amsterdam (NL)

(72) Inventors: Jurriaan Hendrik Ruys, Amsterdam (NL); Eduard Willem Zanen, Oudeschild (NL); Steven Caffall Finch, London (GB)

(73) Assignee: Land Life Company B.V., Amsterdam (NL)

( * ) Notice: Subject to any disclaimer, the term of this patent is extended or adjusted under 35 U.S.C. 154(b) by 208 days.

(21) Appl. No.: 15/032,363

(22) PCT Filed: Oct. 30, 2014

(86) PCT No.: PCT/EP2014/073404
§ 371 (c)(1),
(2) Date: Apr. 27, 2016

(87) PCT Pub. No.: WO2015/063243
PCT Pub. Date: May 7, 2015

(65) Prior Publication Data
US 2016/0262320 A1  Sep. 15, 2016

(30) Foreign Application Priority Data
Oct. 30, 2013 (GB) .................................. 1319258.8

(51) Int. Cl.
*A01G 27/00* (2006.01)
*A01G 27/02* (2006.01)
(Continued)

(52) U.S. Cl.
CPC ........... *A01G 27/02* (2013.01); *A01G 9/0291* (2018.02); *A01G 9/0293* (2018.02);
(Continued)

(58) Field of Classification Search
CPC ................ A01G 13/02; A01G 13/0243; A01G 13/0237; A01G 13/0281; A01G 9/102;
(Continued)

(56) References Cited

U.S. PATENT DOCUMENTS 2,346,029 A * 4/1944 Jennings ................ A01G 27/04
239/44
3,302,325 A * 2/1967 Ferrand .................. A01G 9/102
47/74
(Continued)

FOREIGN PATENT DOCUMENTS

AU 2010201040 A1 10/2011
CN 101601366 A 12/2009
(Continued)

OTHER PUBLICATIONS

CN2492054 (Year: 2002).*
(Continued)

*Primary Examiner* — Thanh Pham
(74) *Attorney, Agent, or Firm* — Fay Sharpe LLP

(57) ABSTRACT

An apparatus for planting a seedling (3) in an arid area comprises a vertical, downwardly tapering shroud (20) and a seedling plug (1) comprising a body of growing medium covered by a moisture resistant cap (14) which preferably is sealingly received in a lower region (22) of the shroud. The lower region of the shroud surrounding the upper portion of the seedling is buried beneath ground level (51) with at least one water reservoir (40, 200) and supplied with water via capillary wicks (43), the reservoir being buried beneath ground level and covered by a moisture resistant cover (60) which sealingly surrounds the shroud. The shroud extends above ground level to protect and shade the seedling and together with the cap (14) and cover (60) serves to retain moisture in the planting region for the first year of growth.

17 Claims, 10 Drawing Sheets

(51) Int. Cl.
  *A01G 13/02* (2006.01)
  *A01G 27/04* (2006.01)
  *A01G 9/029* (2018.01)
  *A01G 22/00* (2018.01)

(52) U.S. Cl.
  CPC ..... *A01G 13/0237* (2013.01); *A01G 13/0243* (2013.01); *A01G 13/0281* (2013.01); *A01G 22/00* (2018.02); *A01G 27/008* (2013.01); *A01G 27/04* (2013.01)

(58) Field of Classification Search
  CPC ........ A01G 7/006; A01G 27/02; A01G 27/04; A01G 27/06; A01G 13/0256; A01G 3/0268; A01G 13/0275; A01G 9/1438
  See application file for complete search history.

(56) References Cited

U.S. PATENT DOCUMENTS

| | | | | |
|---|---|---|---|---|
| 3,755,965 | A | 9/1973 | Emery | |
| 3,857,196 | A * | 12/1974 | Alkire | A01G 25/00 47/48.5 |
| 4,117,631 | A * | 10/1978 | Tull | A01G 27/04 47/81 |
| 4,333,265 | A | 6/1982 | Arnold | |
| 4,336,669 | A * | 6/1982 | Gordon | A01G 9/0291 47/74 |
| 4,348,831 | A * | 9/1982 | Chambers | A01G 9/12 47/32 |
| 4,397,114 | A * | 8/1983 | Skaife | A01G 9/02 47/62 C |
| 5,375,371 | A * | 12/1994 | Wells | A01G 27/06 47/81 |
| 6,134,828 | A * | 10/2000 | DiFillipo | A01G 9/02 248/27.8 |
| 6,497,071 | B1 * | 12/2002 | Main | A01G 27/005 47/40.5 |
| 7,571,566 | B1 * | 8/2009 | Taylor | A01G 9/021 47/41.01 |
| 2005/0011115 | A1 * | 1/2005 | Weder | A47G 7/085 47/41.01 |
| 2010/0115835 | A1 * | 5/2010 | Ronneke | A01G 13/0243 47/65.7 |
| 2010/0162624 | A1 * | 7/2010 | Bradley | A01G 9/02 47/66.7 |
| 2010/0299993 | A1 | 12/2010 | Lais | |

FOREIGN PATENT DOCUMENTS

| | | |
|---|---|---|
| CN | 102599024 A | 7/2012 |
| GB | 2431851 * | 5/2007 |
| NL | 2007198 C | 7/2011 |
| WO | WO 2006132526 A2 | 12/2006 |
| WO | WO 2008062928 * | 5/2008 |
| WO | WO 2009/078721 * | 6/2009 |
| WO | WO 2009078721 A1 | 6/2009 |
| WO | WO 2011031153 A1 | 3/2011 |
| WO | WO 2011068411 A1 | 6/2011 |
| WO | WO 2011084051 A1 | 7/2011 |
| WO | WO 2012081980 A1 | 6/2012 |
| WO | WO 2013096536 A1 | 6/2013 |

OTHER PUBLICATIONS

AquaPro Manual: "Waterboxx Planting Instructions" (undated)—available online on the priority date of GB1319258.8 (i.e., Oct. 30, 2013), pp. 1-33.

International Search Report, PCT/EP2014/073404, Completed Feb. 12, 2015, dated Feb. 20, 2016, Authorized Office Joelle Dagnelies, ISA/EPO, 7 pgs.

Written Opinion of the International Searching Authority, PCT/EP2014/073404, Dated May 7, 2015, 8 pgs.

* cited by examiner

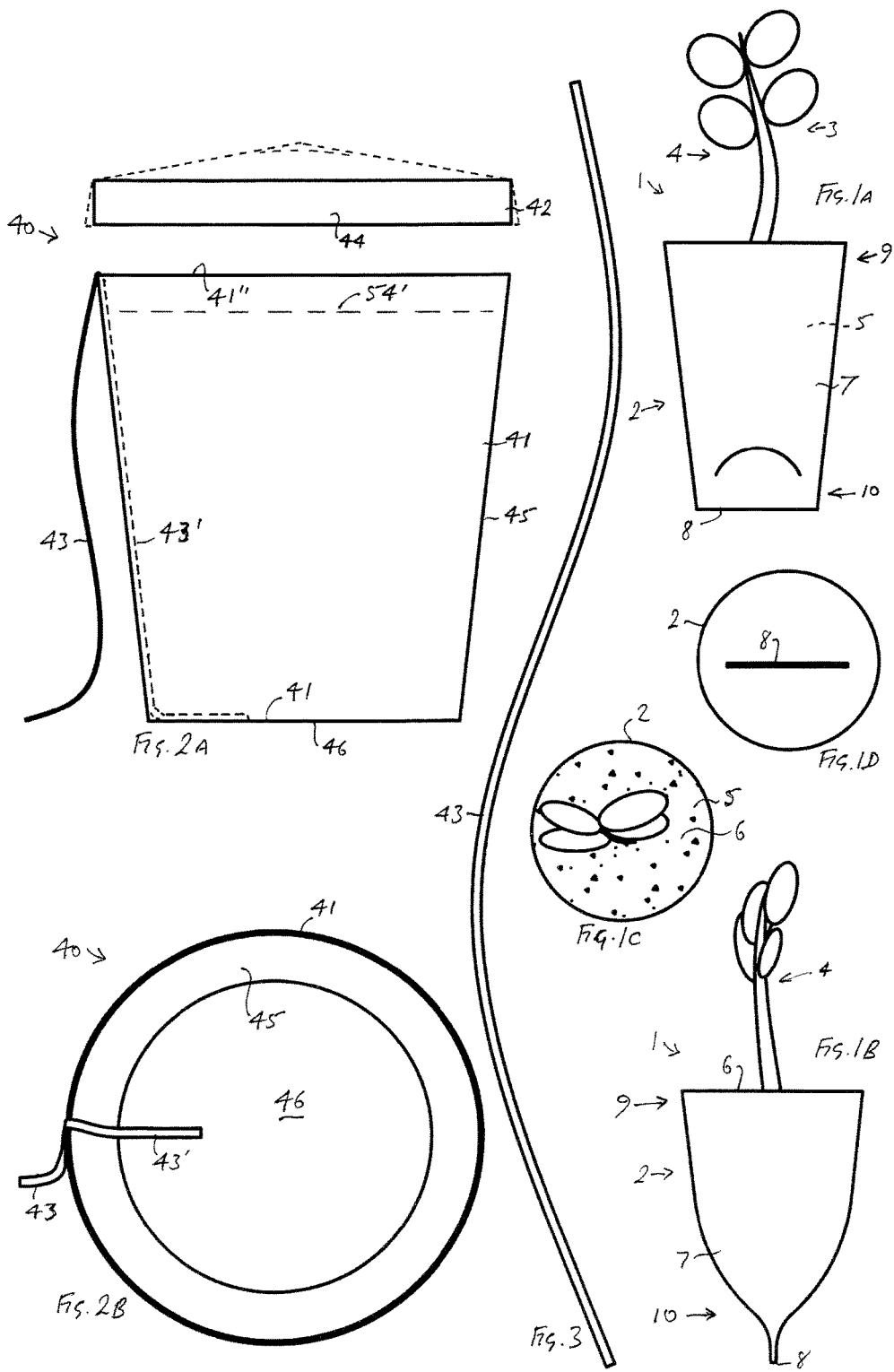

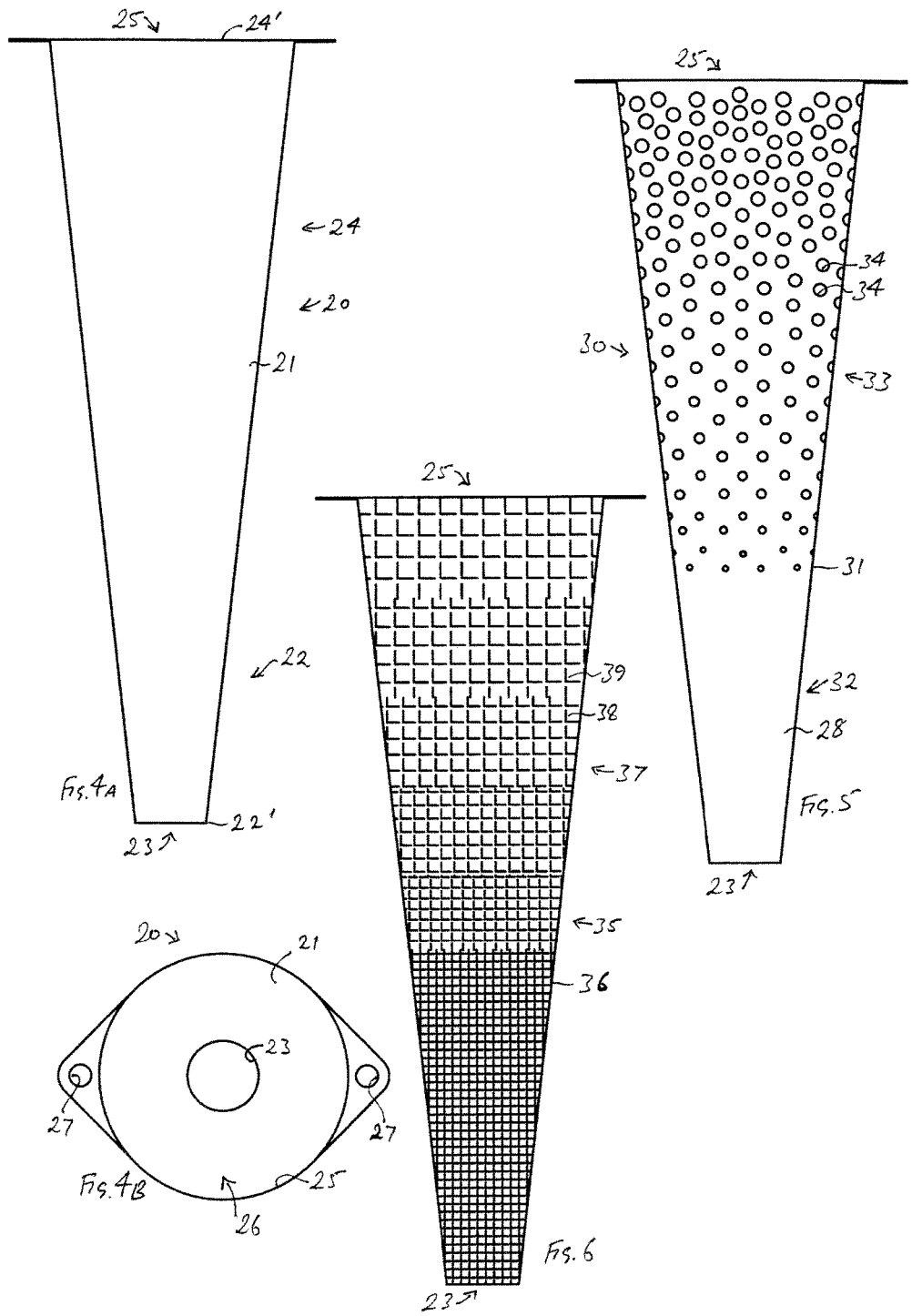

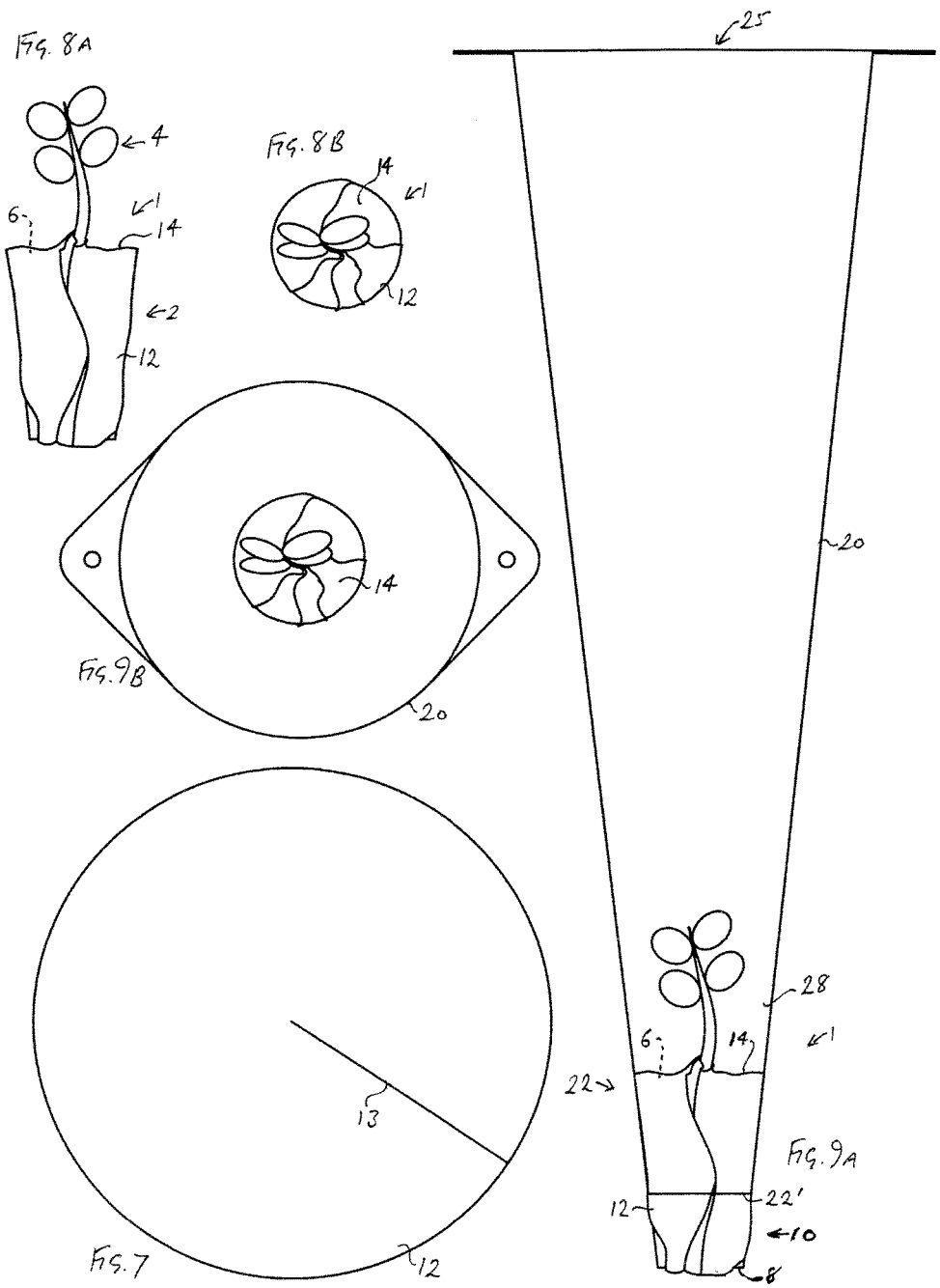

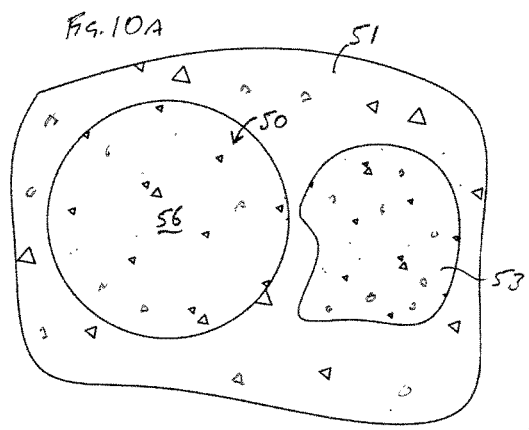
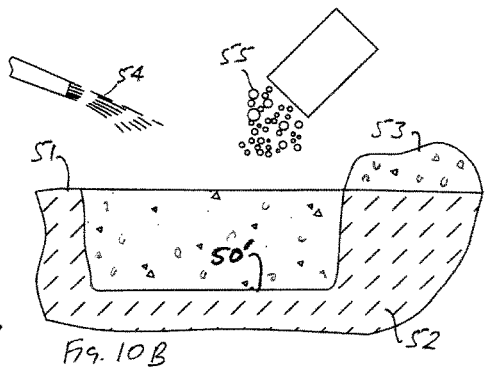
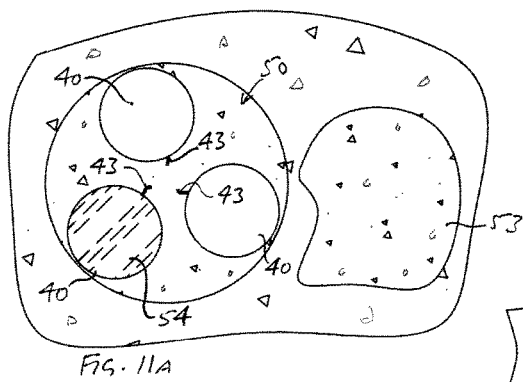
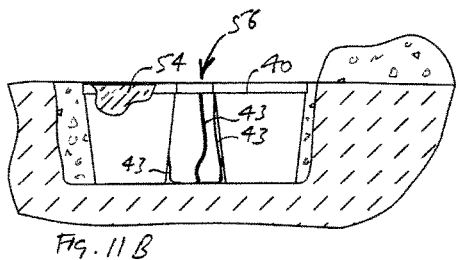
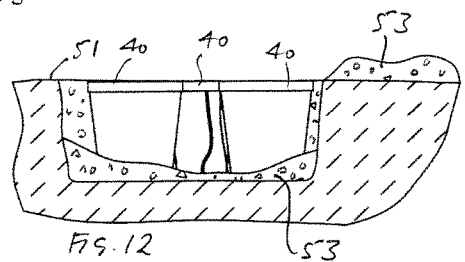
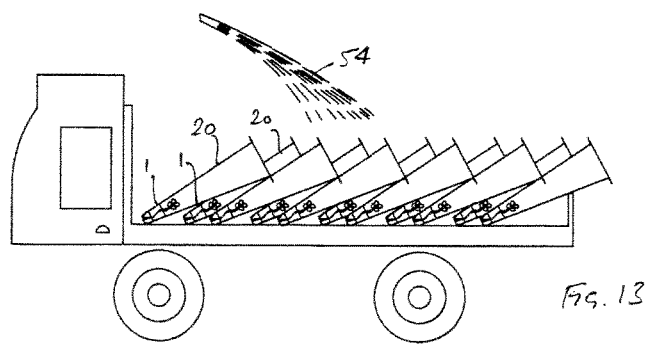

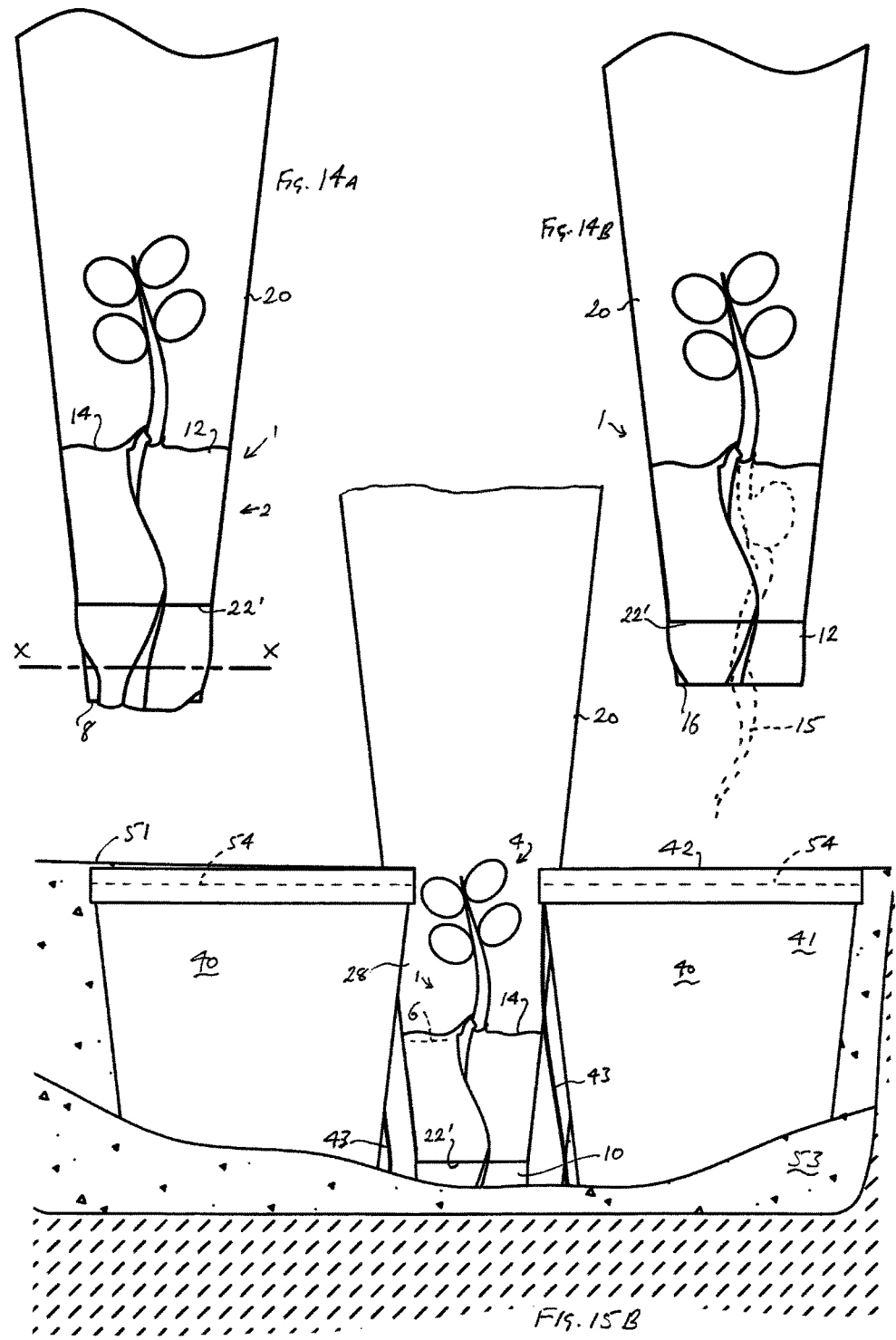

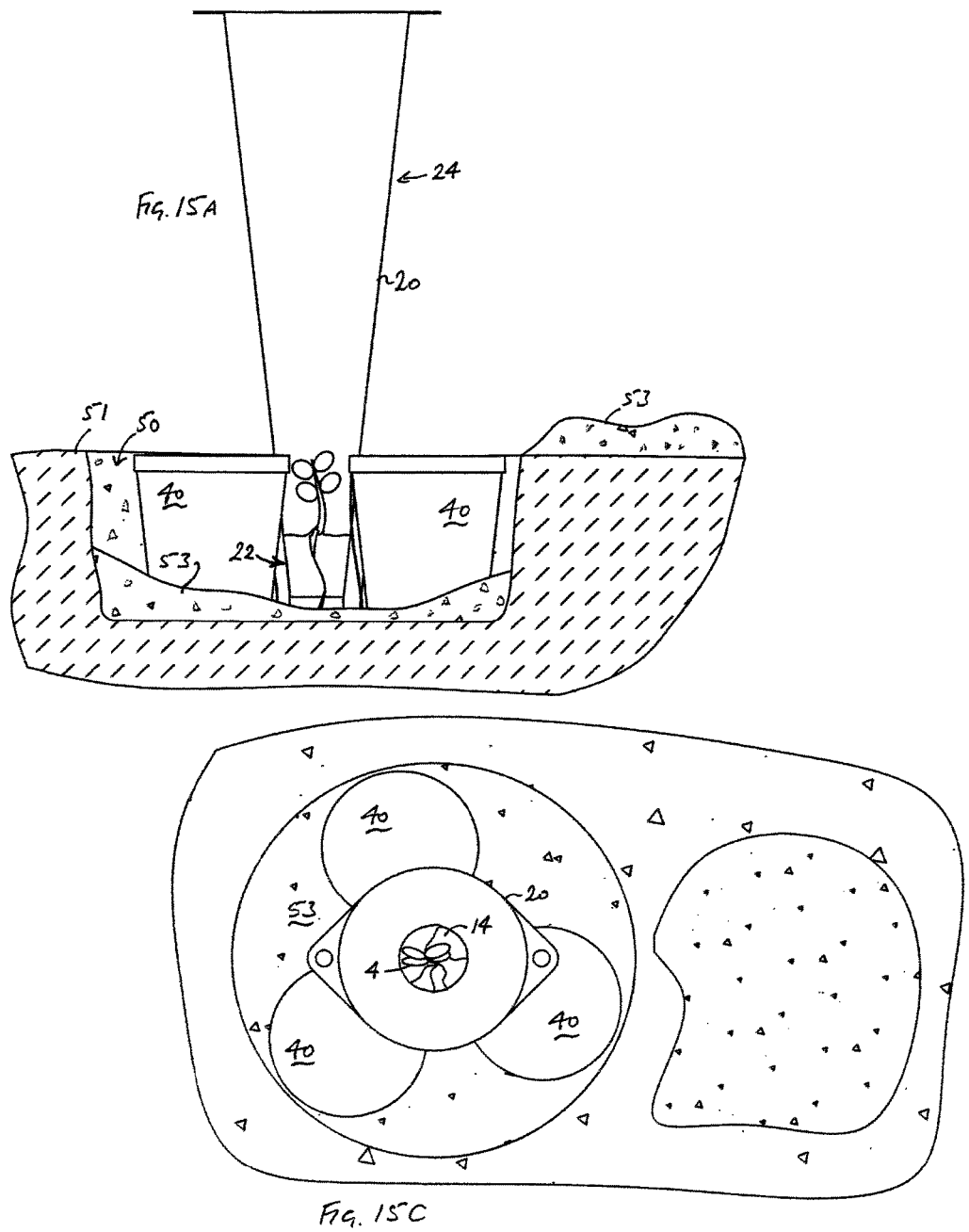

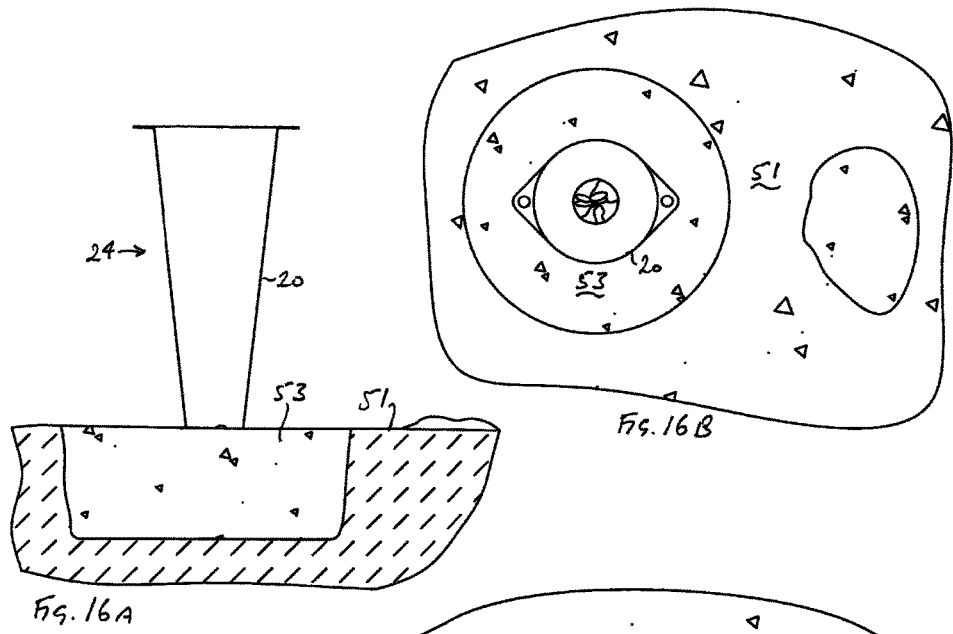
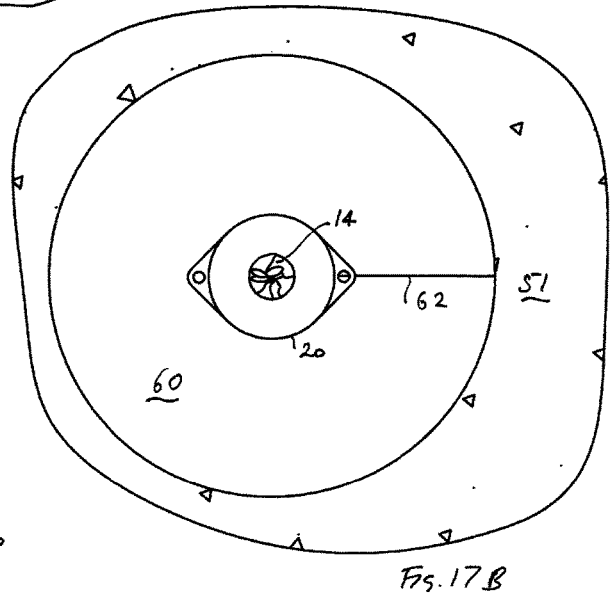
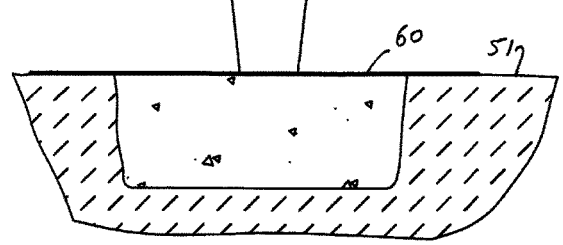

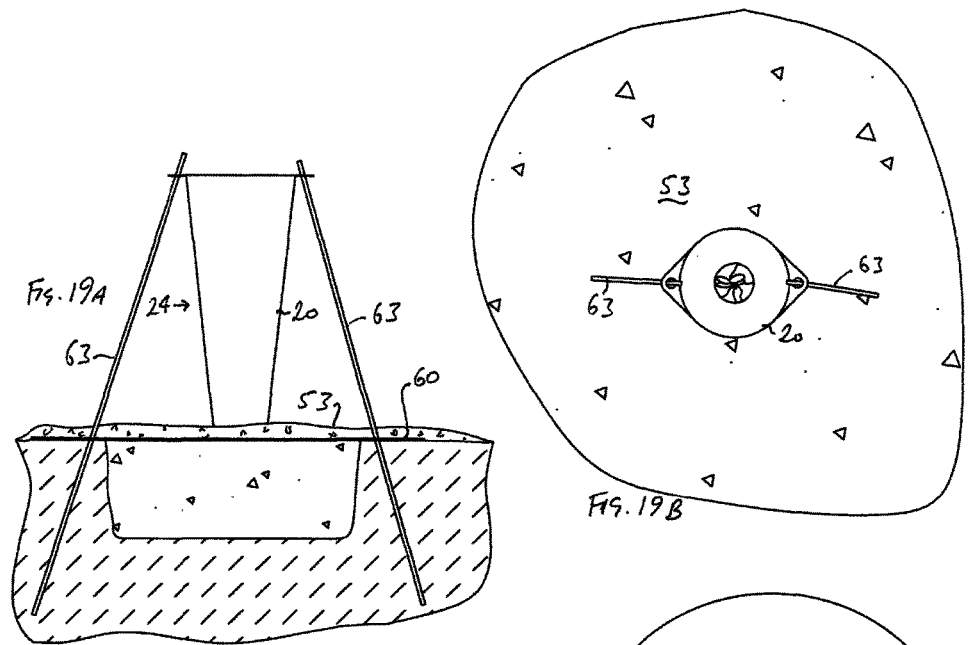
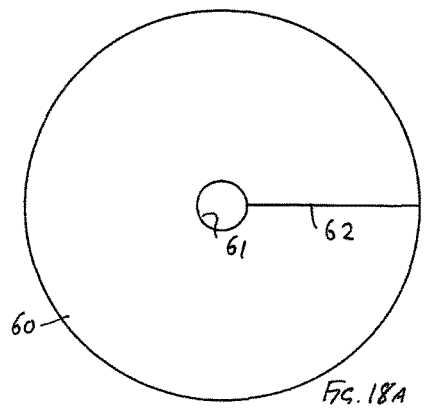
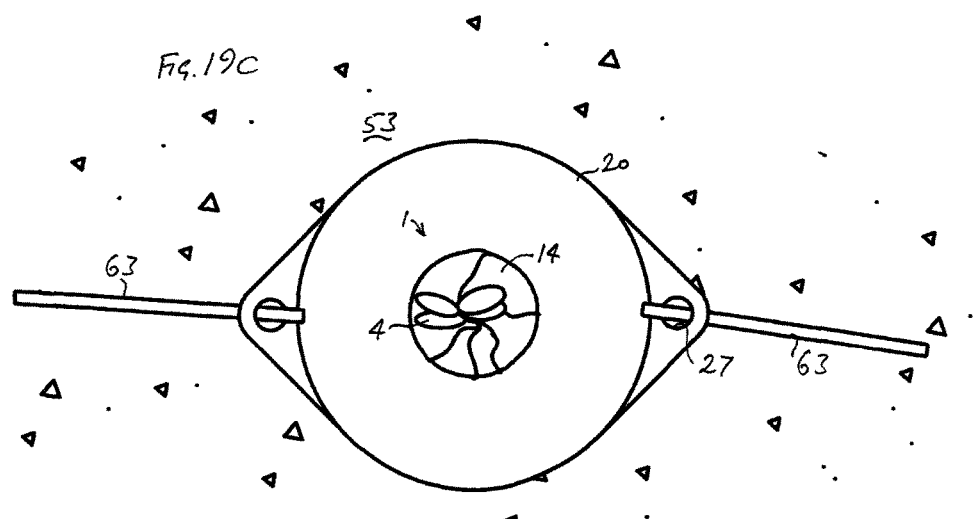

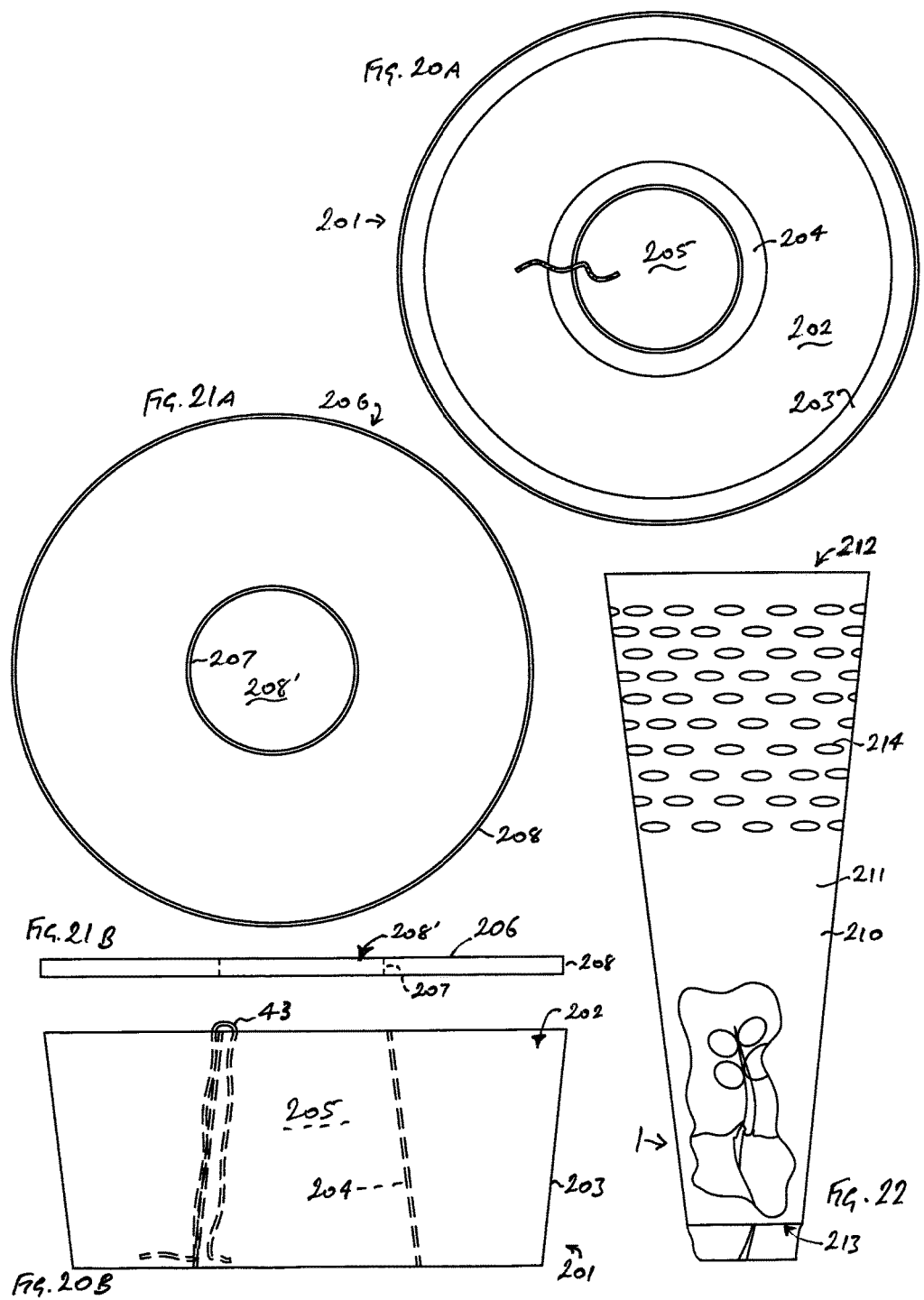

METHOD AND APPARATUS FOR PLANTING IN ARID ENVIRONMENTS

This invention is directed to methods and apparatus for planting seedlings, particularly in arid environments, so as to protect and support the growth of the seedling until its root structure has developed sufficiently to reach the available water in the ground.

In this specification, a seedling means a plant in the initial stages of its life, including for example a small sapling, a sprouted seed or a cutting.

An early type of plant protection apparatus is disclosed by WO2006132526, comprising a water reservoir with an upwardly and downwardly open tube containing a soil block with a seedling. The upper end of the tube is surrounded by a water collection surface for collecting rain or dew to replenish the reservoir. The apparatus is placed on the ground surface, optionally with a stake to support it horizontally above a sloping ground surface, and the ground beneath the apparatus is irrigated from the reservoir via a hollow needle or capillary string. The tube may be made in two parts so as to be openable to remove it from around the established plant.

WO2009078721 discloses a similar apparatus wherein the soil block containing the seedling is received in a clamped manner in a central tube which extends through the reservoir. The roots of the seedling are positioned above the ground surface on which the apparatus stands so that the seedling may grow upwardly and root downwardly through the apertures defined by the upper and lower ends of the tube. Preferably the tube tapers upwardly so that the apparatus can be more easily removed from around the young plant when it has become established. Alternatively, the apparatus may comprise a U-shaped aperture or may be made in multiple parts which can be disassembled to facilitate removal.

A particular problem with the above mentioned earlier type of plant protection apparatus is that, since the soil block containing the seedling is supported in the tube above the ground surface and the container stands on the ground surface, a void may form between the ground surface and the base of the soil block and the base of the reservoir, causing the structure of the water container to deform under the weight of the water so that the lid becomes detached and the water evaporates or spills out over the sides.

A void forming beneath the soil block will also cause the soil block to dry out and discourage the plant from rooting into the soil below. The delicate roots growing down from the soil block may be damaged if the apparatus is dislodged. If air circulates beneath the base of the reservoir then the moisture in the ground may be lost. In addition, moisture may evaporate from the upper surface of the soil block via the tube, so that if the reservoir is not replenished by an adequate supply of dew or rain, the water supply may fail before the plant is established.

In a similar but later type of apparatus, it is known to partially bury the reservoir in a hole in the ground leaving the upper part of the reservoir and the water collection surface exposed above ground level, with the seedling being planted directly in the ground rather than in the apparatus.

WO2012/081980 discloses a plant protection apparatus of this later type, comprising a water reservoir having a central, tubular structure defining an aperture through which a seedling planted in the ground beneath the apparatus may grow while being irrigated from the reservoir.

The aperture is surrounded by a water collection surface for replenishing the reservoir and may be oriented along an East-West axis so as to shade the seedling from the sun at the zenith. The apparatus may be made from biodegradable plastics material or moulded from wood or paper pulp.

An apparatus of this later type may be partially buried in a tapering hole drilled through a hardpan layer as taught by WO2011068411.

WO2011084051 A1 teaches an apparatus of the later type which is partially buried in the ground and anchored at its base by pins. A tubular grid may be fixed to the central tube containing the seedling to extend upwardly from the water collection surface, surrounding the growing plant to protect it from gnawing animals. The grid may comprise apertures which are oriented in different directions so as to provide differential screening depending on the direction of the sun.

A plant protection apparatus of the above described later type is available under the trademark 'WATERBOXX' from Groasis® B. V. of Franseweg 9, 4651PV Steenbergen, The Netherlands, and a detailed instruction manual entitled 'WATERBOXX PLANTING INSTRUCTIONS' is available at www.groasis.com, describing how the apparatus is partially buried in use so that the water collection surface is exposed above the ground surface. Optionally, a body of enriched soil may be provided immediately beneath the seedling. Importantly, the soil beneath the seedling or body of enriched soil is left undisturbed so that its capillary structure remains intact to transport groundwater to the seedling roots.

The applicant has found that when carefully and correctly installed, an apparatus of the above mentioned, later type containing 16 liters of water is capable of maintaining a moist soil environment for the growing seedling for as much as a year without replenishment of the reservoir, even in a hot desert environment.

However, if an apparatus of this type is not correctly installed, it is found that a shallow void may be formed beneath the base of the reservoir. This can lead to deformation of the water container under the weight of the water, causing partial detachment of its lid, so that the water evaporates from the reservoir. If the apparatus is made from a paper or like pulp material rather than moulded from a plastics material, so that the connection between the reservoir body and lid is less secure, this problem may be expected to be more acute.

Moreover, a void forming beneath the reservoir may allow air to circulate so that the moisture in the soil beneath the apparatus evaporates via the central tube, drying out the soil and depriving the seedling of moisture so that the seedling dies before it can become established.

As explained in the abovementioned instruction manual, after digging the hole and adding water and, if necessary, organic material, the evaporation cover comprising a small, flat sheet is placed on the soil surrounding the plant to reduce evaporation from the soil surface immediately beneath the central tube. In order to counteract the abovementioned problem, a quantity of loose soil is then placed on top of this sheet, and the assembled container is placed on top of this mounded soil with the seedling extending up into the central tube. A further sufficient quantity of loose soil is carefully poured through the central tube, and the hole is filled in to bury the lower part of the apparatus. A quantity of water is then poured into the central tube to flow the loose soil into any void space beneath the base of the reservoir.

It is easy in practice to misjudge the quantities of soil and water to be added so as to fill any void without smothering the seedling, especially since soils of different types behave in different ways. Correct placement of the apparatus in different soil types thus requires a significant level of training and experience.

A further problem lies in the time required to place each apparatus in the ground. Where a substantial number of seedlings are to be planted, such as for an afforestation project in an arid area, the seedlings will typically be transported in trays or the like on an open truck.

NL2007198 discloses a propagation tray comprising paper cups which taper downwardly to an aperture through which a seedling taproot may grow, and having a spacer structure which supports the base of the cup above a support surface. The cups may be used to grow seedlings with strong taproots suitable for planting in arid environments by means of the protective apparatus.

These cups are very suitable for growing strongly rooted seedlings for planting in arid conditions, and so are preferred for use with the abovementioned, later type of apparatus. However, propagation containers are typically relatively small in volume and so dry out very readily. Unless the trays of seedlings are frequently and diligently watered, they can become significantly degraded in a relatively short time while they wait on the truck to be planted.

A further problem with the later type of apparatus lies in its relative complexity, comprising a number of interlocking parts which must be manufactured and assembled before use.

Where these parts are made from plastics material so as to be re-usable, the further difficulty arises that the leaves and branches of the young plant may be damaged in the aperture when the apparatus is removed upwardly around it.

WO2011031153 teaches a similar apparatus having a slot communicating with the aperture, whereby the apparatus can be removed laterally from around the growing plant. However, the further problem then arises that rodents and the like may more easily gain access to the seedling.

It is therefore preferred to mould the reservoir from a biodegradable paper or wood based pulp with waterproofing additives, so that it can be left in place around the growing plant.

Where the parts are made from a biodegradable pulp material rather than as a plastics moulding, the increased surface roughness of the interconnecting surfaces where the lid fits into the reservoir may then be expected to increase evaporation, reducing the length of time available for the roots of the plant to reach the groundwater before the reservoir dries out.

It would therefore be desirable to simplify manufacture and reduce the materials requirement so that the apparatus can be disposable and low in cost, without compromising the protection it affords the growing plant.

In light of the abovementioned problems, the present invention sets out to provide a more convenient and/or more effective method and apparatus for establishing a seedling, particularly in an arid area.

In accordance with the invention there are provided a planting apparatus, a kit of parts, and a method for planting a seedling using the novel apparatus as defined in the claims.

The invention recognises that by minimising evaporative moisture loss it is possible to provide sufficient stored water to support a seedling during its first year without replenishment of the reservoir, so that no water collection surface is required. This makes it possible to provide a much simpler apparatus wherein the or each reservoir and the seedling are located below ground level, so that the whole apparatus is better protected from animals, evaporation is reduced to a minimum, and the seedling benefits from a more constant microclimate.

Advantageously, the shroud is provided as a separate part from the container or containers forming the reservoir, the separate parts being arranged together in the planting hole with the or each container buried in the soil. This means that the fluid pressure on the walls of the reservoir is balanced by the pressure of the surrounding soil. For that reason, the or each container can be made in a simple shape from paper or other biodegradable pulp material and with a relatively small wall thickness. The simple shape is stronger and more mechanically stable, cheaper to produce, and more closely stackable so that it is more space efficient during transportation, and has relatively greater water capacity compared with its volume and materials content as compared with the more complex prior art containers which provide water collection surfaces. At the same time, the separate shroud makes it possible to flow loose soil around and beneath the seedling and the or each reservoir without inadvertently covering the seedling. By burying the reservoir, the likelihood of detachment of the reservoir lid is reduced, and evaporation from the reservoir can be reliably prevented. Moreover, the reservoir is better protected against damage by animals, as is the seedling due to the shroud which extends above ground level.

Optionally, at least two or, more preferably, at least three reservoirs may be used, which minimises mechanical deformation of each reservoir due to its relatively smaller footprint and loadbearing area, provides redundancy in case one of the reservoirs is damaged, minimises disturbance of the capillary structure of the ground by more completely filling the hole, and allows the seedling to benefit from the thermal microclimate created by the thermal mass of the water in the reservoirs by placing it between the reservoirs in the centre of the hole.

Alternatively, a single reservoir can be used, which may be annular with a central tubular aperture for receiving the shroud containing the seedling so that the water surrounds the seedling, again providing a beneficial microclimate.

Further features and advantages will become apparent from the following illustrative embodiments which are described, purely by way of example and without limitation to the scope of the claims, and with reference to the accompanying drawings, in which:

FIGS. 1A-1D show a seedling plug respectively in front view (FIG. 1A), side view (FIG. 1B), top view (FIG. 1C) and bottom view (FIG. 1D);

FIGS. 2A and 2B show parts of a reservoir before filling with water, respectively in side view (FIG. 2A) and top view (FIG. 2B);

FIG. 3 shows the wick of the reservoir;

FIGS. 4A and 4B show a shroud, respectively in side view (FIG. 4A) and top view (FIG. 4B);

FIG. 5 shows a first alternative shroud;

FIG. 6 shows a second alternative shroud;

FIG. 7 shows a wrapper;

FIGS. 8A and 8B show the seedling plug after covering the plug body with the wrapper, respectively in side view (FIG. 8A) and top view (FIG. 8B);

FIGS. 9A and 9B show the seedling plug and wrapper inserted into the shroud, respectively in side view (FIG. 9A) and top view (FIG. 9B);

FIGS. 10A and 10B show a hole being prepared for planting, respectively in plan view (FIG. 10A) and in side view with the ground cut away to show the inside of the hole (FIG. 10B);

FIGS. 11A and 11B show the reservoirs arranged in the hole, respectively in plan and side view;

FIG. 12 shows the hole prepared to receive the shroud and seedling plug, in side view;

FIG. 13 shows a batch of seedling plugs being transported in their shrouds to the planting site;

FIGS. 14A and 14B show the seedling plug in the shroud, respectively before (FIG. 14A) and after (FIG. 14B) trimming the root;

FIGS. 15A-15C show the shroud containing the seedling plug placed in the hole, respectively in side view (FIG. 15A), enlarged side view (FIG. 15B), and plan view (FIG. 15C);

FIGS. 16A and 16B show the hole filled with soil, respectively in side view (FIG. 16A) and plan view (FIG. 16B);

FIGS. 17A and 17B show the cover sheet positioned over the hole, respectively in side view (FIG. 17A) and plan view (FIG. 17B);

FIGS. 18A and 18B show the cover sheet, respectively in plan view (FIG. 18A) and side view (FIG. 18B);

FIGS. 19A-19C show the final step wherein the cover sheet is covered by a layer of loose soil and the shroud is secured with stakes, respectively in side view (FIG. 19A), plan view (FIG. 19B), and enlarged plan view (FIG. 19C);

FIGS. 20A and 20B show the body of an alternative, annular reservoir with a single wick, respectively in plan and side view;

FIGS. 21A and 21B show a lid of the annular reservoir of FIG. 20, respectively in plan and side view;

FIG. 22 shows the seedling plug in another alternative shroud (partially cut away to show the seedling plug) just before planting;

Corresponding reference numerals indicate corresponding parts in each of the figures.

Figure 23:
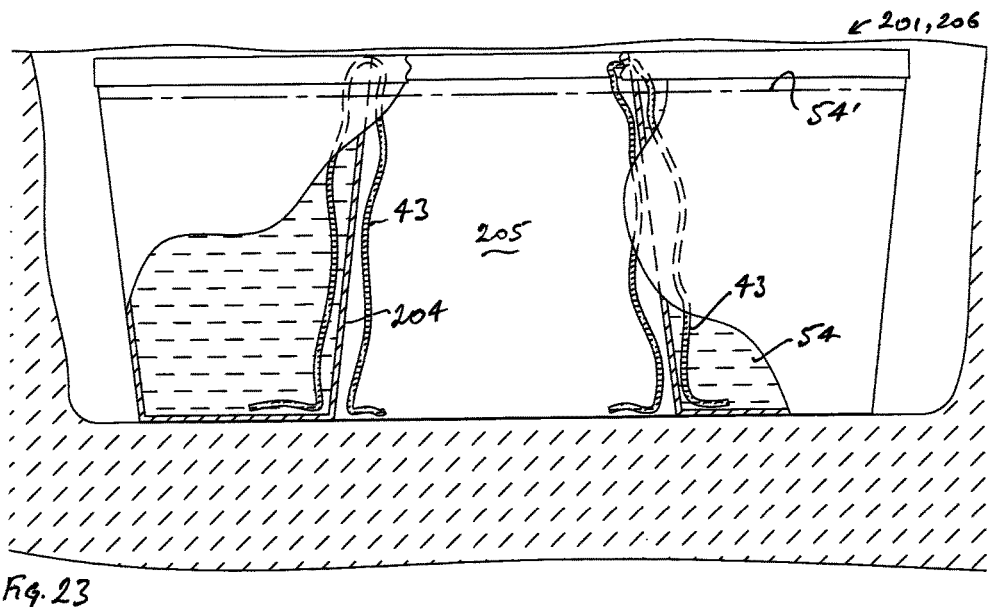
FIG. 23 shows the annular reservoir of FIGS. 20-21 with a pair of wicks, positioned in a hole before returning a portion of the excavated soil to the hole.

Referring to FIGS. 1A-1D, a seedling plug 1 comprises a plug body 2 and a seedling 3. The plug body includes at least a body of growing medium 5, which may be a compressed soil or compost or, more conveniently, may be a body of soil or the like contained in a moisture permeable cup 7 made from paper, burlap, jute, cloth or the like, the seedling growing in the plug body so that an upper portion 4 of the seedling protrudes from an upper surface 6 of the medium 5. In the illustrated embodiment, the cup 7 narrows downwardly to a non-circular lower tip or base 8, which where the seedling 3 is a tree with a strong taproot, encourages the taproot to grow straight downwards. The cup can be made individually or as a tray assembly, and the base may be supported in air so that if the taproot reaches the base of the cup it can continue to grow downwardly through the base.

Referring to FIGS. 4A and 4B, a shroud 20 comprises a generally frustoconical wall 21 of sheet plastics material, having a lower region 22 defining at its lower end 22' a circular lower aperture 23 and an upper region 24 defining at its upper end 24' a circular upper aperture 25, the two apertures being spaced apart in opposed relation to define the respective ends of the internal cavity 26 surrounded by the wall. The shroud tapers downwardly in its use position along its vertical length axis towards the lower aperture as shown. The plastics wall may be made from a biodegradable plastics material as known in the art, so that it need not be removed, but disintegrates before the stem of the plant reaches the diameter of the lower aperture. It may be formed from a flat sheet with a seam or moulded as a unitary part, in which case it may have a line of weakness formed for example by very small perforations (not shown) so that if necessary it is released more easily by pressure from the expanding stem of the growing plant. The thickness of the wall (about 1 mm-2 mm or even less in the illustrated example) is negligible relative to the overall height of the shroud. At the upper aperture the wall 21 is extended outwardly to provide two fixing holes 27.

In this specification, "moisture resistant" means at least sufficiently resistant to the transmission of moisture (in the form of water and/or water vapour) to substantially reduce evaporative moisture loss, and preferably substantially impermeable by water or water vapour.

In the illustrated embodiment, the wall 21 of the entire shroud is moisture resistant and substantially imperforate, it being understood that "substantially imperforate" will include both the case (as illustrated) where the wall is substantially impermeable by moisture and completely imperforate, and the case where for example a line of weakness is provided, the line of weakness being formed by perforations too small and localised to result in substantial evaporative moisture loss.

Although for ease of illustration the shroud is shown as transparent, it is more preferably translucent but not transparent so that it acts as a filter to provide shade to the seedling. Most preferably, the shroud is arranged to provide graduated shade so that the seedling is exposed to a progressively increasing amount of light so as to harden it to the prevailing climatic conditions as it grows upwardly through the shroud. This is achieved by arranging the wall in the upper region 24 of the shroud to have graduated permeability by light so that the wall becomes progressively more permeable by light towards the upper aperture. For example, the wall may incorporate or be coated with a varying concentration of pigment so that it becomes relatively less translucent and more opaque towards the lower region 22 and relatively more translucent and less opaque towards the upper aperture 25.

FIG. 5 shows an alternative shroud 30 generally similar in shape to the first, in which the wall 31 in the lower region 32 of the shroud is moisture resistant and substantially imperforate, while the wall in the upper region 33 of the shroud is provided with perforations 34 which become progressively larger and/or more closely spaced towards the upper aperture, so that the perforations have a combined area which increases progressively relative to a total solid surface area of the wall 31 towards the upper aperture 25. The solid material of the wall 31 is translucent or opaque, and may be made for example from a waterproof paper or cardboard material, so that the perforations act as a graduated filter to admit progressively more light to the seedling as it grows towards the upper aperture.

FIG. 6 shows a further alternative shroud 35 generally similar in shape to the first, wherein the wall 36 is made from a transparent or translucent material and is moisture resistant and substantially or entirely imperforate, including in the upper region 37 of the shroud where it has a coating of light reflective material 38 (for example, white paint) applied in a graduated pattern 39 so that the density of the light reflective material progressively reduces towards the upper aperture 25, providing progressively less shading as the plant grows upwards.

The novel shroud in its various forms may be used in other horticultural applications unrelated to the novel planting apparatus so as to harden a growing plant by exposing it to a gradually increasing amount of light.

Referring to FIGS. 1A-1B and FIGS. 7-9B, when the seedling is to be planted, the plug body 2 is wrapped in a moisture resistant wrapper 12, which in the illustrated embodiment comprises a circular sheet or membrane of moisture resistant material such as waterproof paper or plastics material, e.g. polyethylene, which may be biodegradable, with a slit 13. The upper portion 4 of the seedling is inserted into the slit and the wrapper arranged so that it encloses the upper portion 9 of the plug body, covering at least the upper surface 6 of the growing medium 5 as well as the sides of the paper cup 7. It will be noted that the paper cup 7 has downwardly tapering sides which match the taper of the lower region 22 of the shroud. The upper portion 9 of the plug body is wider than the lower aperture 23 of the shroud, while the lower portion 10 of the plug body is narrower than the lower aperture 23.

The seedling plug together with the wrapper is then inserted into the shroud 20 via the upper aperture 25 so that the plug body 2 fits sealingly in the lower region 22 of the shroud with the lower portion 10 of the plug body extending downwardly from the lower aperture 23 beneath the lower end 22' of the shroud (FIGS. 9A, 9B). In this position the wrapper 12 is trapped between the sides of the plug body and the wall of the shroud, creating a moisture resistant seal around the plug body, so that the portion of the wrapper covering the upper surface 6 of the growing medium forms a moisture resistant plug cap 14 which is sealingly engaged with the lower region of the shroud, preventing moisture in the soil and growing medium surrounding the roots of the seedling at the base of the shroud from evaporating.

Of course, although the seal is effective in reducing evaporation to a negligible level, it is not completely impermeable by standing water, so that in the event of heavy rain in the months following planting, water collecting in the shroud is still able to drain down slowly between the folds of the wrapper 12 through the slit 13 and between the wrapper 12 and the wall 21 of the shroud, past the seedling plug into the ground beneath. The term "sealingly" should be construed accordingly.

In alternative embodiments, the wrapper may extend only part way down the sides of the paper cup, or may terminate at the upper end of the cup.

Referring to FIGS. 2-3 and FIGS. 10-11, a hole 50, optionally round and about 60 cm wide and 25 cm deep, is dug through the ground surface 51 in the ground 52 comprising soil (for example, sand) 53, with the excavated soil 53 left in a pile by the hole. This can be accomplished by means of a tractor carrying a drill, a mechanical excavator, or by hand using a shovel to excavate a round or rectangular hole.

In desert areas the soil will be sand which is prepared by filling the hole with 40 liters of water 54, adding organic material 55, and allowing the water and organic material to soak into the soil overnight. (FIGS. 10A, 10B).

The next day, at least one and, in the illustrated embodiment, three reservoirs 40 are arranged in the hole. Each reservoir comprises a container 41 with a lid 42 and an irrigation element comprising a wick 43. Advantageously, the container 41 is separate from the shroud 20, which greatly simplifies installation as well as manufacture of both components, decouples the reservoirs from mechanical forces applied to the shroud, and allows the shroud to be used to protect the seedling during transport to the planting site. (Other system components however may be integrated with each other if desired.)

The wick 43 is made from a strip of capillary matting material, e.g. nylon or PLA, of the order of about 5 mm wide which acts as an irrigation element to provide a small, controlled flow of water from the container, with the width of the wick being selected to provide the desired rate of flow.

The three containers are positioned symmetrically as shown close by or against the side of the hole, and the wicks 43 are arranged over the sides of the containers. A mark (not shown) half way along the length of each wick is positioned at the rim of the container so that the wick extends for an equal distance inside and outside the container, one end resting on the flat base of the container and the other on the surface of the soil in the centre 56 of the hole between the containers.

Advantageously, the portion 43' of the wick extends inside the container 41 from the base 41' of the container to an upper part of the container, preferably the rim 41" of the container as shown, which is arranged in use above the maximum water level 54', so that a part of the wick remains immersed in the water above the base of the container as the water level falls; this means that if sludge accumulates in the bottom of the container it cannot completely clog the immersed portion of the wick to prevent its capillary function. Optionally, the wick 43 can be attached to the inside and outside of the container wall, e.g. by adhesive, either a waterproof adhesive or a soluble adhesive such as a sugar or gelatine solution, to simplify installation; optionally, the end of the wick may be held in position, e.g. by an insoluble adhesive or a mechanical anchor or weight, at the base of the container to ensure that it remains fully immersed.

After placing the container and the wicks in position, the containers are filled with water 54 and closed with their lids 42 so that the wick extends under the rim 44 of the lid (FIGS. 11A, 11B). A part of the excavated soil 53 is then returned to the hole, forming a shallow covering over the trailing ends of the wicks in the centre 56 and filling the gaps between the reservoirs and the sides of the hole (FIG. 12).

In practice, it is found that the water contained in the reservoir when it is initially filled is sufficient to sustain the seedling for the first year until its roots have penetrated to the permanent groundwater. The novel apparatus therefore preferably dispenses with the water collection surface of the prior art. This makes it possible to bury the reservoirs completely under the soil, which in turn supports the containers and protects them from mechanical damage and attack by animals, so that each container can be made relatively less robust that if it were exposed above the ground. The fully buried installation is also much better protected from the heat of the sun, so that by positioning the surface of the growing medium below ground level, the seedling is provided with a more constant microclimate. The lower temperatures also make it possible to make the reservoirs from a wood or paper pulp coated with wax or the like which would melt if exposed directly to the sun.

In this embodiment, each container 41 is of a simple bucket shape with a frustoconical wall 45 tapering slightly downwardly to a flat base 46. This optimises the volume of the reservoir relative to its surface area so as to reduce the quantity of materials required. The containers and lids can be made for example from plastics material or, advantageously, of biodegradable material so that they can be left in place to decay around the growing plant. When moulded from a biodegradable pulp, such as paper or wood or other cellulose pulp with a water resistant additive or coating, e.g. of wax, plastics film or other material as known in the art, the teachings of GB276395 and GB456434A being two early examples, the simple shape makes it easier to remove from the mould, so that the walls 45 need not be unduly thick. The simpler shape can also be stacked more easily, reducing the cost of transportation. Optionally, the lid can have a tapered rim and/or a conical or domed upper surface, as indicated by dotted lines in FIG. 2A, to ease removal from the mould and improve its loadbearing characteristics.

Since the reservoir preferably does not comprise a water collection surface, it can be covered by a lid 42 having a rim 44 that fits downwardly and closely or sealingly over its sides, with the wick extending over the side of the reservoir under the rim. This more effectively prevents evaporation from the reservoir as compared with some of the conventional art in which the water collection surface fits downwardly into the open upper end of the reservoir, necessitating upwardly facing joints. This in turn makes it possible to manufacture the novel apparatus from biodegradable pulp while still providing enough water to last for a full year, since in an underground environment evaporation is at most only minimally increased by the resulting rough surfaces of the joints between the container and lid as against the smoother, more closely fitting surfaces of a plastics moulding, whereas the rougher surfaces of a pulp moulding would be expected to result in much faster evaporation from the joints of the prior art apparatus in an above ground environment.

It is preferred to form the irrigation element as a wick, optionally comprising a flat strip of capillary material since this is cheap to make and readily adaptable by selecting the width of the strip to the required flow rate, and provides a reliable and very slow flow of water which is responsive to the moisture demand of the plant. Alternatively any other suitable wicking material can be used, e.g. a round bundle or cord of filamentary material. The or each wick may be glued or otherwise attached to the base of the reservoir to ensure that it remains in the water for as long as the water lasts. In the illustrated example, each wick provides a flow of about 20 ml per day, the three wicks together supplying 60 ml per day to the plant, and each reservoir contains 8 liters of water so that the water supply lasts for slightly more than one year. By arranging the wick over the rim of the container so that its middle part extends above the water level of the reservoir, leaks are reliably prevented.

The thermal mass of the water in the reservoirs surrounding the growing plant stabilises the soil temperature in the region of its roots, and as the water level in each container reduces, the side wall and lid may gradually collapse as soil replaces the volume occupied by the water.

After inserting the seedling plug 1 into the lower region 22 of the shroud, the shroud containing the seedling plug is transported to a planting location (FIG. 13). The shrouds 20 containing the seedling plugs 1 are preferably sprayed with water 54 while they wait to be planted, so that the water runs through the perforations (if any) in the shrouds. In any event, the shrouds and plug caps serve to retain moisture in the planting medium so that the seedling can better tolerate exposure to the sun if watering is neglected during this time. Of course, the seedling plugs and shrouds could instead be transported separately to the planting site, with each seedling plug being inserted into the shroud just before planting.

Before placing the shroud in the hole, the lower tip 8 of the plug body is cut off along the cut line X-X (FIG. 14A). This ensures that if the taproot has reached the lower tip inside the paper cup, it is trimmed. Subsequent growth of the taproot 15 will then be vertically downward through the cut end 16 of the paper cup, ensuring that the tree roots sufficiently deeply to reach the permanent groundwater, as known in the art (FIG. 14B).

Preferably, the leaves are also trimmed to balance the plant's demand for water with the capacity of the temporarily reduced root structure to supply it, as known in the art.

The shroud 20 containing the seedling plug 1 is then placed upright in the hole with the lower region 22 of the shroud containing the plug body arranged centrally in the hole between the reservoirs, and the cut end 16 of the paper cup resting on the thin layer of soil above the trailing ends of the wicks (FIGS. 15A-15C).

The hole is then at least partially, preferably completely filled with soil 53 so that at least the reservoirs 40 and preferably also the lower region 22 of the shroud containing the plug body 2 are buried in the soil, the upper surface 6 of the growing medium is about 10 cm below the ground level 51', the lower portion 10 of the plug body is in contact, preferably with the soil 53 or at least with a base 50' of the hole, the plug cap 14 covers the upper surface 6 of the growing medium inside the shroud, and the upper portion 4 of the seedling 3 protrudes through the plug cap into the lower region of the shroud, as shown (FIGS. 16A, 16B). Most preferably, the upper surface 6 of the growing medium is arranged below the water level 54' in the reservoirs so that the upper portion of the seedling immediately above the upper surface 6 of the growing medium is arranged in the more stable thermal microclimate established by the thermal mass of the water. This helps protect very small seedlings from drying out.

Advantageously, where the wall in the lower region of the shroud is moisture resistant and substantially imperforate, it acts to retain moisture in the ground around the roots of the seedling and in the region between the upper surface 6 of the growing medium and the level of the ground surface 51, preventing it from evaporating upwardly via the shroud, as well as preventing loose soil from entering the shroud and smothering the seedling before it has grown above ground level.

In an alternative embodiment, a portion of the lower region of the shroud which is arranged in use in contact with the walls of the plug body may be permeable or perforated while another portion 28 of the lower region of the shroud surrounding the upper part of the seedling which is arranged in use between the plug cap at the upper surface 6 of the growing medium and the ground level 51' (i.e. the level of the ground surface 51) is moisture resistant and substantially imperforate. This provides for moisture transmission between the walls of the plug body and the surrounding moist soil, while still retaining soil and preventing the evaporation of moisture through the wall of the shroud in the region between the upper surface 6 and the ground surface.

Referring to FIGS. 18A-18B, a cover 60 is provided to reduce moisture loss by evaporation and so help to retain moisture in the planting hole. The cover 60 is moisture resistant (i.e. at least capable of reducing evaporative moisture loss by resisting the transmission of water and/or water vapour through the cover) and has a central aperture 61 for receiving the shroud, and a slit 62 extending between the aperture and its circular outer margin. The aperture 61 is larger than the lower aperture 23 of the shroud and smaller than the upper aperture 25, so that when the shroud 20 is positioned at the correct depth in the soil its wall is received sealingly in the aperture 61, which is to say, sufficiently closely to avoid any substantial evaporative moisture loss from between the cover and the shroud. The shroud is inserted into the aperture 61 via the slit 62 as the cover 60 is slid over the ground surface to lie above the reservoirs so that the shroud extends upwardly through the aperture 61 above the ground surface (FIGS. 17A, 17B).

The cover 60 may be generally sheetlike and may have any shape, for example circular as shown or rectangular, and its width and length dimensions or diameter may range from, for example, around 45 cm up to, for example, 60-70 cm, or even 1 m or more so that it extends to cover an area beyond the reservoirs; by suitably selecting the size of the protected area, evaporation can be minimised even in extremely arid environments. It may comprise a flexible, moisture impermeable membrane such as polyethylene sheet cut from a roll, and/or a mechanically structured, e.g. corrugated material such as a corrugated fibreboard, biodegradable plastics material or paper or cardboard material with a water resistant component or coating, which also provides mechanical protection to the reservoirs beneath the ground surface. It may be thermally insulative and may be arranged with a sloping surface to channel rain or dew to the growing plant. Preferably it extends in use around the shroud to cover an area above substantially all of the or each reservoir and/or substantially all of the planting hole in order to minimise evaporation from the planting hole. It may comprise one or more sheetlike components wherein the aperture is formed during installation between the edge or edges of the or each of the components, for example, by wrapping an elongate sheet around the shroud.

The cover could be integral with the reservoir or reservoirs, for example, forming a lid of the reservoirs. The cover could be integral with the shroud, for example, forming a skirt part way up the wall 21 and above the base region of the shroud which anchors the shroud in the ground, so that the shroud extends upwardly through the cover in its use position.

Preferably the cover includes at least a moisture resistant membrane or sheetlike element, which is both convenient and effective in use.

Less preferably, and depending on the conditions at the planting location, the cover may be formed in situ from a layer of loose, moisture resistant material such as gravel, which lacks any capillary structure and so serves to reduce the transmission of moisture by capillary action from the planting hole to the ground surface where it would otherwise be lost by evaporation.

Still less preferably, the cover could consist of a layer of loose sand or sandy soil or the like, which due to its lack of capillary structure may be expected to reduce evaporative moisture loss at least to a degree (and while it retains its loose, porous structure) by resisting the transmission of water by capillary action. In each case the shroud defines an aperture in the cover, the loose material being arranged around the shroud so that the shroud is received in the aperture.

In yet further alternative embodiments, a settable composition such as an aqueous suspension of paper pulp, wood or plastics particles and/or a cementitious, polymeric or other binder material may be applied to the surface of the soil over the planting hole and around the shroud, e.g by spraying or pouring, either lying on the soil or penetrating to a small depth into the soil so that it sets to form a cover consisting of a moisture resistant layer with an aperture defined by the shroud which sealingly penetrates the layer.

Since in arid areas rainfall is very infrequent and often very heavy, resulting in flash flooding, it is relatively less important to channel rainwater to the plant than to prevent evaporation from the planting region; in fact, the cover sheet may usefully serve to protect the planting installation from erosion by flash flooding, which may overturn above-ground structures as known in the art.

Referring finally to FIGS. 19A-19C, a 5 cm layer of loose material such as soil 53 or rocks is then arranged over the sheet or membrane forming the cover 60 to provide additional thermal insulation and protect it from wind and animal damage. Optionally, two or three wooden or bamboo stakes 63 may be driven into the ground through the fixing holes 27 in the shroud so that it cannot be dislodged by wind or animals. The stakes may alternatively be made from metal or plastics material. In an alternative embodiment, one stake or three or more stakes may be used, with three stakes arranged in a pyramidal configuration being particularly preferred for optimal stability, the shroud being adapted to have a corresponding number of fixing holes. In yet further alternative embodiments, the or each stake could be inserted through a respective hole, optionally pre-punched, in the cover 60, taking care to ensure that the stake is positioned between the reservoirs.

Of course, the dimensions of the hole and the various elements of the novel apparatus can be adapted as desired, and the containers 41 may be relatively greater in depth and of sufficiently small diameter that the loadbearing capacity of the container lids together with the cover 60 and upper layer of soil is sufficient to prevent collapse under the weight of a larger animal indigenous to the region of use.

The upper region of the shroud preferably extends substantially (for example, at least about 25 cm, preferably at least about 35 cm, up to about 50 cm or more) above the ground surface 51, so that as well as providing shade to the seedling it protects it from small rodents and the like. It also mechanically protects the seedling as it grows from larger ruminants which due to the depth and narrowness of the shroud cannot reach far enough into it to nibble on the seedling. For example, the shroud may have an overall length of about 50 cm-70 cm, a lower aperture about 8 cm in diameter and an upper aperture about 25-30 cm in diameter.

The lower region of the shroud may extend about 20-25 cm below the ground surface so that it effectively anchors the upper region in the ground. Optionally, the lower region may include an additional anchor structure (not shown) extending outwardly beneath the ground surface. Advantageously, by forming the shroud as a separate part from the reservoir, the shroud is mechanically decoupled from the reservoirs so that forces applied to the upper part of the shroud by the wind and by larger animals do not damage the reservoirs in the ground beneath it.

Figure 24:
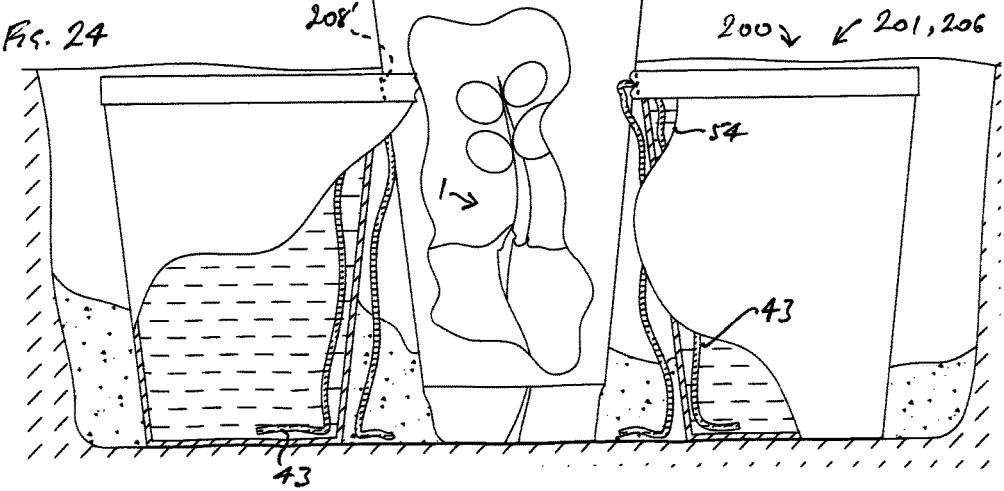
FIG. 24 shows the shroud and seedling of FIG. 22 inserted into the tubular central aperture of the reservoir of FIG. 23.

Referring to FIGS. 20-24, an alternative embodiment uses a single reservoir 200 including a body portion 201 and lid 206. The body portion defines a container comprising an annular compartment 202 with a downwardly tapering outer wall 203 of circular cross section and an upwardly tapering inner wall 204 which defines a central tubular aperture 205. A circular lid 206 is arranged with shallow inner 207 and outer 208 lips to overhang the upper edges of the inner and outer walls in use. The lid and body of the reservoir may be made from biodegradable pulp material as described above. One, two, three or more wicks 43 are arranged over the inner wall 204 underneath the lid so as to extend from the base of the annular compartment down to the ground level inside the aperture 205. In the illustrated embodiment the annular compartment can be filled with about 22-28 liters of water.

The seedling plug 1 is arranged as previously described in a shroud 210 which in this embodiment comprises a conical wall 211 of opaque sheet material with upper 212 and lower 213 apertures and elliptical perforations 214 in its upper region. The elliptical perforations (or any other perforation shape with longer horizontal than vertical axis) provide relatively more shading as the sun rises to its zenith and allow progressively more light through in morning and evening.

The annular reservoir 201 is arranged in the planting hole, the annular compartment filled with water 54 to the water level 54', and covered with the lid 206. A small quantity of soil is returned to the hole within the central aperture 205 and around the outer wall 203 and optionally flowed beneath the reservoir with water before introducing the seedling plug in the shroud 210 into the central aperture as described above with reference to the earlier embodiments. The central aperture 205 can be filled with soil if desired during this procedure, with the remaining steps of the method being carried out as described above, the remaining soil being returned to the hole to bury the reservoir before arranging the cover (not shown). In this embodiment however the shroud is self supporting and no stakes are required, so the shroud does not include fixing holes. The shroud may fit closely into the hole 208' defined by the inner lip of the lid so that the components of the reservoir help to support it in position.

As with the previous embodiments, the shroud may be tapering so that its diameter corresponds to that of the growing seedling as the seedling reaches higher, providing optimal protection, but rather than being conical, it could alternatively be of hexagonal or other non-circular cross-section, which could be tapering or alternatively non-tapering, i.e. continuous along its length axis.

In summary, a preferred embodiment provides an apparatus for planting a seedling in an arid area, comprising a vertical, downwardly tapering shroud and a seedling plug covered by an impermeable cap which is sealingly received in a lower region of the shroud. The lower region of the shroud is buried beneath ground level with at least one water reservoir and supplied with water via capillary wicks, the reservoir being buried completely beneath ground level and covered by an impermeable cover which sealingly surrounds the shroud. The shroud extends above ground level to protect and shade the seedling and together with the membrane and cover serves to retain moisture in the planting region for the first year of growth. Importantly, by positioning the upper surface of the growing medium below the ground surface as shown, and preferably also surrounding the seedling plug with the water contained in the reservoir or reservoirs, a very stable microclimate is created for the seedling, even in extremely hot and arid climates.

Advantageously, the novel apparatus comprises simple components which can be manufactured at low cost, and is also simple to use and more reliable in operation that the prior art apparatus, particularly when installed by less skilled operatives. The moisture resistant plug cap and lower region of the shroud combine with the moisture resistant cover to form an effective barrier to evaporation of moisture, even in extremely hot and arid conditions, so that the water supply can last for a full year without replenishment, long enough for the roots of the seedling to reach a permanent supply of groundwater.

Mycorrhizae, nutrients, insecticides, fungicides, biocides and/or other additives may be provided in the growing medium or soil or incorporated in or attached to the biodegradable system components, as known in the art.

In the illustrated embodiment, the plug cap 14 comprises a membrane 12 which encloses at least an upper portion of the plug body, and the seedling plug is inserted together with the plug cap into the shroud so that the seedling protrudes through the plug cap when the plug body is received in the lower region of the shroud. This has the additional benefit of retaining moisture in the shroud during transport to the planting site.

In alternative embodiments, the plug cap could comprise a rigid lid, a loose, moisture resistant material such as gravel, or a settable composition, e.g. an aqueous suspension of paper or wood pulp or plastics particles and/or a polymeric or other settable liquid or binder, which is carefully poured into the shroud after the shroud containing the seedling plug is placed in the planting hole to form a moisture resistant barrier layer covering the upper surface of the growing medium around the seedling. Alternatively, the plug cap could comprise a somewhat smaller membrane than that illustrated, made from moisture resistant paper or plastics (e.g. polyethylene) material, so that it covers only the upper surface 6 of the growing medium and terminates at the wall of the shroud, or alternatively, so that it covers the upper surface 6 of the growing medium and extends for only a short distance down the outer wall of the plug body, terminating part way between the upper surface 6 and the base 8. Although in some embodiments the plug cap may not seal closely against the wall of the shroud, it will nevertheless cover the upper surface 6' of the growing medium sufficiently to prevent a substantial loss of moisture by evaporation.

In less preferred embodiments, the whole of the lower region of the shroud could be perforated, the shroud could be cylindrical or any other shape rather than frustoconical, optionally having a downwardly tapering portion proximate its lower end, and/or its upper region could extend only minimally above ground level, in which case the seedling could be protected from attack by rodents and grazing ruminants by a separate barrier of wire or plastics mesh or the like. The shroud could be formed for example from waterproof paper or cardboard or other suitable materials instead of from plastics material. In yet further embodiments, the shroud could be assembled (before, during or after insertion of the seedling plug) from more than one part.

In alternative embodiments, the or each reservoir may comprise a waterproof bag, such as a biodegradable or non-biodegradable plastics bag, instead of a rigid or semi-rigid container as shown. The reservoir can be sealed by tying the mouth of the bag sealingly around the wick. The waterproof bag may be buried directly in the ground, and may comprise a thin membrane of polyethylene or the like surrounded by a thicker layer of mechanically protective material. Alternatively, one or more bags may be arranged within a rigid or semirigid biodegradable container with a lid to protect the bag from mechanical damage. In this case, the container can be a very simple structure such as a cardboard box or simply a cylinder formed from flat or corrugated cardboard sheet, which may be transported in a flat condition and assembled on site, and covered at its open, upper end by the cover 60. It is also possible to form the waterproof bag from a sheet of waterproof material, e.g. polyethylene, which may be laid in the hole or in such a container. The margin of the sheet is gathered together and tied around the wick, or simply trapped between the rim of a container and its lid. The reservoir may thus be made from commonly available materials rather than requiring special manufacture.

In further alternative embodiments, the wick 43 could be arranged in an aperture in the base of the container or could be replaced by other capillary material, a permeable membrane, a dripper, or any other means for providing a controlled flow of water from the enclosure as known in the art.

In each case, the or each reservoir includes an irrigation means for providing a controlled flow of water from the respective container. Instead of forming the irrigation means as an irrigation element separate from the container, such as a wick as shown in the illustrated embodiment, the irrigation means could be integral with the container or lid. For example, the reservoir could comprise a flexible bag made from a slightly permeable membrane which contains the water, so that the bag functions as both container and irrigation means, the irrigation means being provided by the channels through which water is conducted through the membrane of the bag. Alternatively, the irrigation means could be a small hole or a group of small holes in an otherwise impermeable bag forming the reservoir.

In yet further alternative embodiments, the plug cap could be part of a membrane which forms the cup enclosing the growing medium. The plug body could be any convenient shape, including a pot or cup with a flat base and a cylindrical or frustoconical sidewall.

In yet further alternative embodiments, the shroud may comprise two or more parts. For example, the upper region of the shroud might be separate from the lower region of the shroud, with the upper and lower regions being arranged in use to form a continuous structure defining a cavity extending from the upper to the lower aperture within which the seedling can grow. In one such embodiment, the lower region of the shroud may be integral with the cover, with the upper region of the shroud being attachable to the cover or to the lower region of the shroud after the seedling has been planted. The lower region of the shroud may form a cup or container for the seedling plug, so that the growing medium forming the plug body is received in the lower region of the shroud together with the seedling or a seed which is subsequently propagated within the lower region of the shroud until it is ready for planting. The seedling plug contained in the lower region of the shroud can then be transported to the planting site and planted in a similar manner to the illustrated embodiment before the upper region of the shroud is connected to the lower region, for example by placing it around the lower region or inserting it telescopically into the lower region to complete the installation. The upper and lower regions of the shroud may be tapered to define a short region in which they can be sealingly and telescopically received, one inside the other.

Alternatively or additionally, the upper region of the shroud may be integral with the cover. Alternatively, either the upper or the lower region may include a flange or skirt which extends for a short distance radially outwardly from the length axis of the shroud to connect the shroud with the cover. The upper and lower regions may be formed from different materials, for example, comprising respectively an open mesh or perforated sheet, and a sheet having a substantially imperforate and moisture resistant portion which extends at least between the plug cap at the upper surface 6 of the growing medium and the ground surface.

In these or other embodiments the plug cap may also be integral with the shroud, forming for example an internal flange within the lower region of the wall of the shroud or at an assembly joint between the upper and lower regions.

Alternatively, the plug cap could be integral with the cover, so that the cover extends partially into the cavity inside the shroud between the upper and lower regions of its wall to form an internal flange which surrounds the stalk of the seedling. For example, the shroud could be formed in separate, upper and lower regions, with the cover being formed as a sheet of polyethylene or the like, with a slit cut in it to receive the upper part of the seedling. The seedling is planted within the lower region of the wall of the shroud, an upper end of which (optionally defining a radially outwardly extending flange or skirt) terminates a short distance below ground level at the level of the upper surface of the growing medium, with the planting hole being filled with soil to that level. The cover is laid over the soil and the upper part of the seedling is pushed through the slit in the cover so that it protrudes above the cover. The upper region of the shroud is then positioned above the lower region on top of the cover, for example, by mechanically connecting it to the lower region through the cover, or simply by placing it in axial alignment with the lower region, so that the central region of the cover extending between the upper and lower regions of the shroud forms the plug cap. The upper region of the shroud may also have an integral skirt or flange which sits on top of the cover. The planting hole is then filled to or slightly above ground level using soil or other loose material which is arranged above the cover and around the upper region of the shroud to anchor the shroud and the cover and hold the parts in their assembled position. Finally, stakes may be arranged as shown in the illustrated embodiment to further support the upper region of the shroud.

Optionally, the seedling plug may be arranged in the lower region of the shroud either before or after arranging the shroud in the planting hole, and it should be understood therefore that the respective steps of the method may be carried out in any order as appropriate. For example, the step of arranging the seedling plug in the shroud may be carried out either before or after the step of arranging the shroud upright in the hole. Where the shroud comprises two or more separate parts, the step of arranging the shroud upright in the hole may be carried out in two or more steps, which may be accomplished before, after, and/or simultaneously with the step of arranging the moisture resistant cover above the at least one reservoir.

In a yet further embodiment, the plug body need not be arranged in the lower region of the shroud, in which case the seedling plug may be arranged in the planting hole before the shroud is positioned above it to surround only the upper portion of the seedling. This may be accomplished by first positioning the or each reservoir in the planting hole so that the water level 54' in each reservoir is below the ground level 51'. The hole is then partially backfilled with soil and the seedling plug positioned in the hole, preferably between the reservoirs, so that the upper surface 6 of the growing medium is positioned below the ground level 51' and, preferably, below the water level 54', which ensures that the thermal mass of the water provides a more stable microclimate not only for the roots but also for the vulnerable upper portion of the seedling, which may extend upwardly to a growing tip somewhat below or above ground level, depending on its stage of growth.

The soil in the hole is leveled to cover the reservoirs before the plug cap is arranged to cover the upper surface 6 of the growing medium. Where the plug cap is formed from a poured or sprayed settable composition or loose material, this may be done before or after positioning the shroud. The plug cap may also be formed from a membrane, either forming a sheet of material or formed in place from a settable composition or layer of loose material, wherein the membrane may optionally be integral with the cover so that the plug cap and cover form integral parts of a single membrane.

For example, the cover may comprise a membrane formed from a settable composition or from a sheet of polyethylene or moisture resistant paper or cardboard material with a central slit; the cover being placed on the surface of the soil in the planting hole so that the seedling protrudes through the composition or slit. Another sheet of like material may be positioned over the first, with the seedling protruding through slits in both sheets, the slits being arranged out of alignment so as to more completely prevent evaporation through the two sheets. The lower region of the shroud may be integral with or separate from the upper region, and may terminate in a separate or integral flange or skirt surrounding the lower aperture. The lower region of the shroud is placed over the seedling so that the flange or skirt extends radially outwardly in a horizontal plane around the lower aperture and rests sealingly in flat, abutting relation on the membrane or sheet of material forming the plug cap, with the wall of the shroud extending upwardly from the flange or skirt (conically or cylindrically) about its vertical central axis, so that the central region of the membrane or of the or each sheet (containing the slit through which the seedling protrudes) forms the plug cap below the lower aperture of the shroud, and the remainder of the membrane or of each sheet surrounds the shroud to form the cover which extends over the reservoirs to or somewhat beyond the margins of the hole.

The hole is then completely filled with soil or other loose material to bury the cover and anchor the base of the shroud in position, after which three stakes may be arranged through holes in the cover to anchor the shroud and the cover in position similarly to those shown in the illustrated embodiment.

In yet further embodiments, the plug body may include a paper cup or the like which is extended above the upper surface 6 of the growing medium to form a wall that surrounds the upper portion of the seedling. Alternatively, the plug body may be inserted into a separate sleeve (e.g. a corrugated or flat paper sleeve) which after insertion extends above the upper surface 6 of the growing medium to form a wall that surrounds the upper portion of the seedling. The seedling plug may then be arranged in the preferred position so that the upper surface 6 of the growing medium is below the water level 54' in the reservoirs, with the wall of the paper cup or sleeve serving to hold back the loose soil between the reservoirs during planting. The shroud may then be inserted into the open upper end of the paper cup or sleeve so that it sealingly engages the plug cap at the upper surface 6 of the growing medium. The wall of the paper cup or sleeve also helps to anchor the lower region of the shroud in the correct position. The plug cap can be positioned over the upper surface 6 of the growing medium either before or after positioning the shroud. Like the previous embodiments, the hole is filled to ground level with soil or other loose material, and stakes are positioned to stabilise the upper end of the shroud, optionally extending through holes in the cover.

Those skilled in the art will readily conceive many further adaptations within the scope of the claims.

The invention claimed is:

1. A planting apparatus for installation in a planting hole to support the growth of a seedling growing in a body of growing medium, the planting apparatus including:
   a shroud, and
   at least one underground reservoir;
   the at least one underground reservoir including:
      a container for containing water to a water level,
      a lid for closing an open upper end of the container, and
      irrigation means for providing a controlled flow of water from the container;
   the container being separate from the shroud;
   the shroud including:
      a wall,
      an upper region defining an upper aperture, and
      a lower region defining a lower aperture, the lower region being configured to surround at least an upper portion of the seedling in use;
   wherein the container is moulded from a biodegradable pulp, and wherein the lid does not comprise a water collection surface for refilling the reservoir, and the reservoir is not arranged to be replenished in use.

2. A planting apparatus according to claim 1, wherein:
   the apparatus being arranged in a use position in a planting hole extending downwardly below a ground level with the container buried in the planting hole and filled with water to a water level,
   the upper region of the shroud extending upwardly above the ground level, and
   the lower region of the shroud extending below the ground level.

3. A planting apparatus according to claim 2, wherein
   the container includes a base, an inner wall and an outer wall, the inner wall defining a central aperture extending through the container, and
   the lid includes a hole; and
   the lid is arranged on the container to close the open upper end of the container with the hole communicating with the central aperture of the container; and
   the shroud is arranged in the hole in the lid so that the reservoir supports the shroud.

4. A planting apparatus according to claim 2, wherein the lid comprises a rim which extends downwardly to enclose the upper end of the container in use.

5. A planting apparatus according to claim 4, wherein the irrigation means comprises a capillary wick, and the wick extends inside the container from the base of the container to the upper end of the container.

6. A planting apparatus according to claim 2, wherein at least a portion of the wall in the lower region of the shroud is moisture resistant and substantially imperforate.

7. A planting apparatus according to claim 2, wherein the wall in the upper region of the shroud has graduated permeability by light so that the wall becomes progressively more permeable by light towards the upper aperture.

8. A planting apparatus according to claim 2, wherein the wall in the upper region of the shroud is provided with perforations having a combined area which increases progressively relative to a total solid surface area of the wall towards the upper aperture.

9. A planting apparatus according to claim 2, wherein the container is coated with wax.

10. A method for preparing a planting hole in ground to support the growth of a seedling when the seedling is planted in the planting hole below a ground level, including:
   digging a hole in the ground;
   arranging at least one reservoir in the hole, the at least one reservoir including a container and a lid, the container being moulded from a biodegradable pulp and filled with water to a water level;
   arranging the lid to close an open upper end of the container, and
   arranging an irrigation means to provide a controlled flow of water from the container; and further including:
   providing a shroud separate from the reservoir, the shroud including a wall, a lower region defining a lower aperture, and an upper region defining an upper aperture, the lower region being configured to surround at least an upper portion of the seedling in use; and arranging the shroud so that the lower region of the shroud extends into the hole below the ground level and the upper region of the shroud extends above the ground level; and wherein the container is buried in the planting hole, and the reservoir is not arranged to be replenished in use.

11. A method according to claim 10, wherein the container includes a base, an inner wall and an outer wall, the inner wall defining a central aperture extending through the container, and the lid includes a hole; and the lid is assembled on the container to close the upper end of the container so that the hole communicates with the central aperture of the container, and the shroud is arranged in the hole in the lid so that the reservoir supports the shroud.

12. A method according to claim 10, wherein the container is coated with wax before the container is buried in the planting hole.

13. A method according to claim 10, wherein the lid comprises a rim which is arranged to extend downwardly to enclose the upper end of the container.

14. A method according to claim 13, wherein the irrigation means comprises a capillary wick, and the wick is arranged to extend inside the container from the base of the container to the upper end of the container.

15. A method according to claim 10, wherein at least a portion of the wall in the lower region of the shroud is moisture resistant and substantially imperforate.

16. A method according to claim 15, wherein the wall in the upper region of the shroud has graduated permeability by light so that the wall becomes progressively more permeable by light towards the upper aperture.

17. A method according to claim 15, wherein the wall in the upper region of the shroud is provided with perforations having a combined area which increases progressively relative to a total solid surface area of the wall towards the upper aperture.

* * * * *